United States Patent [19]
La Fetra et al.

[11] Patent Number: 5,155,828
[45] Date of Patent: Oct. 13, 1992

[54] COMPUTING SYSTEM WITH A CACHE MEMORY AND AN ADDITIONAL LOOK-ASIDE CACHE MEMORY

[75] Inventors: Ross V. La Fetra, Cupertino; John F. Shelton, Aptos, both of Calif.

[73] Assignee: Hewlett-Packard Company, Palo Alto, Calif.

[21] Appl. No.: 810,523

[22] Filed: Dec. 17, 1991

Related U.S. Application Data

[63] Continuation of Ser. No. 376,264, Jul. 5, 1989, abandoned.

[51] Int. Cl.⁵ .............................................. G06F 12/08
[52] U.S. Cl. .............................. 395/425; 364/243.41; 364/243.44; 364/228.5
[58] Field of Search ................... 395/425; 364/DIG. 1

[56] References Cited

U.S. PATENT DOCUMENTS

| | | | |
|---|---|---|---|
| 3,964,054 | 6/1976 | Annunziata et al. | 364/200 |
| 4,077,059 | 2/1978 | Cordi et al. | 364/200 |
| 4,442,287 | 4/1984 | Fletcher et al. | 364/200 |
| 4,445,174 | 4/1984 | Fletcher | 364/200 |
| 4,670,839 | 6/1987 | Pilat et al. | 364/200 |
| 4,683,533 | 7/1987 | Shiozaki et al. | 364/200 |
| 4,719,568 | 1/1988 | Carrubba et al. | 364/200 |
| 4,843,542 | 6/1989 | Dashiell et al. | 395/425 |
| 5,008,813 | 4/1991 | Crane et al. | 364/200 |

*Primary Examiner*—Eddie P. Chan
*Attorney, Agent, or Firm*—Roland I. Griffin; Alan H. Haggard

[57] ABSTRACT

A computing system includes a processor, a system memory containing data utilized by the processor and two cache memories. Each cache memory is connected directly to the processor. A first cache memory is connected to the processor and to the system memory. The first cache memory contains a subset of data in the system memory. A second cache memory is also connected to the processor. The second cache memory contains a subset of data in the first cache memory. Data integrity in the system memory is maintained using the first cache memory only. Whenever the processor writes data, the processor writes data both to the first cache memory and to the second cache memory. Whenever the processor reads data, the processor attempts to read data from the second cache memory. If there is a miss at the second cache memory, the processor attempts to read data from the first cache memory. If there is a miss at the first cache memory, the data is retrieved from the system memory and placed in the first cache memory. The processor then reads the data from the first cache memory. Generally, when the processor reads data from the first cache memory, the read data is written into the second cache memory.

13 Claims, 3 Drawing Sheets

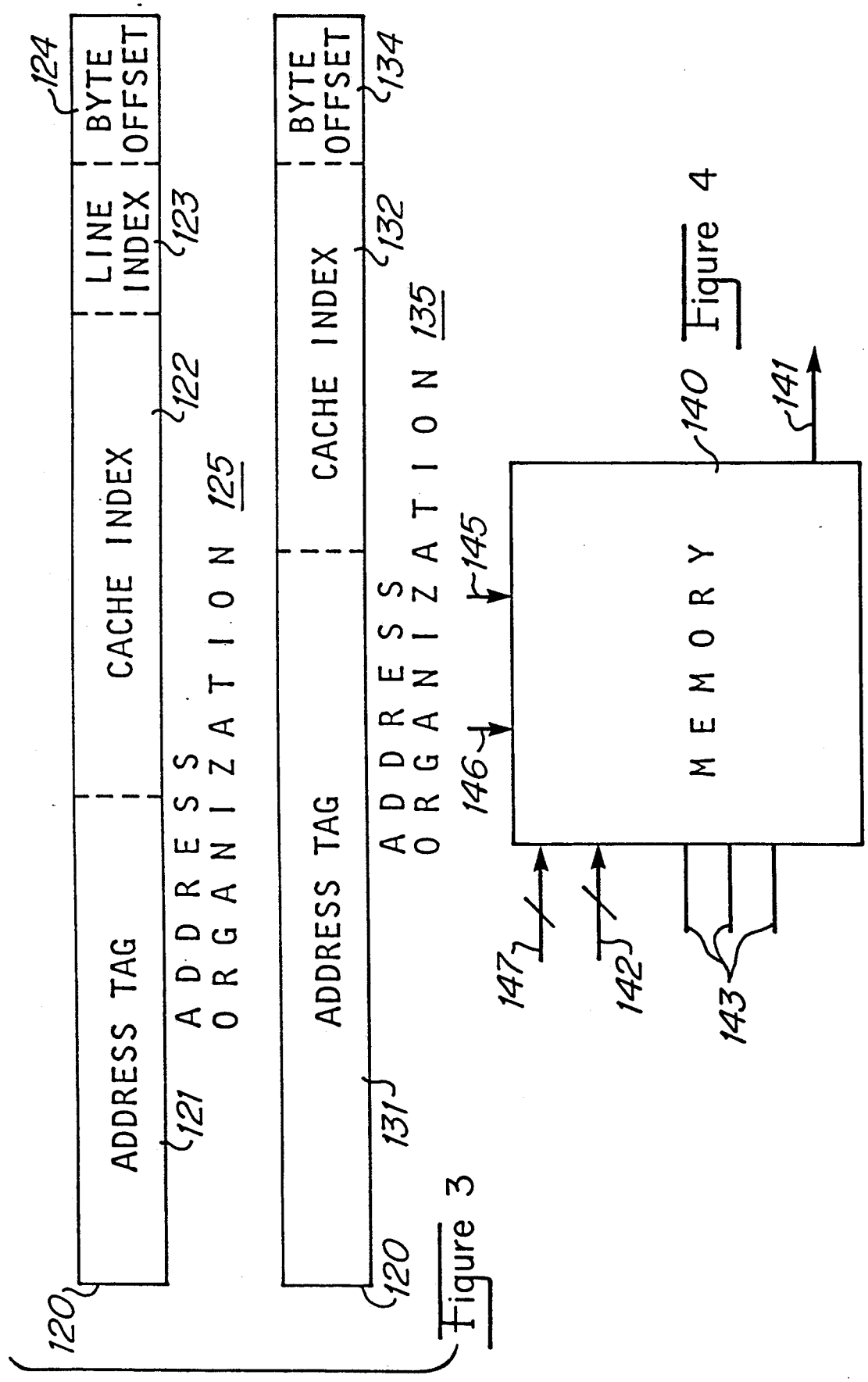

COMPUTING SYSTEM WITH A CACHE MEMORY AND AN ADDITIONAL LOOK-ASIDE CACHE MEMORY

CROSS REFERENCE TO RELATED APPLICATION

This application is a continuation of application Ser. No. 07/376,264, filed Jul. 5, 1989, now abandoned.

BACKGROUND

The present invention relates to a computer system which utilizes a small, fast look-aside cache memory in addition to a standard cache memory.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor.

In addition to using a cache memory to retrieve data from main memory, the CPU may also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. In many systems a data "dirty bit" for the data block is then set. The dirty bit indicates that data in the data block is dirty (i.e., has been modified), and thus before the data block is deleted from the cache memory the modified data must be written into main memory. If the data block into which data is to be written does not exist in the cache memory, the data block must be fetched into the cache memory or the data written directly into the main memory. A data block which is overwritten or copied out of cache memory when new data is placed in the cache memory is called a victim block or a victim line.

In some applications a second cache memory is added in series between the first cache memory and the main memory. The first cache memory typically has a subset of the data in the second cache memory. Similarly, the second cache memory typically has a subset of the data in the main memory. Accessed data is first searched for in the first cache memory. If there is a miss in the first cache memory, the accessed data is searched for in the second cache memory. If there is a miss in the second cache memory, the data is fetched from the main memory.

SUMMARY OF THE INVENTION

In accordance with the preferred embodiment of the present invention a computing system is presented. The computing system includes a processor, a system memory containing data utilized by the processor and two cache memories. Rather than being connected in series, each cache memory is connected directly to the processor. A first cache memory is connected to the processor and to the system memory. The first cache memory contains a subset of data in the system memory. A second cache memory is also connected to the processor. The second cache memory contains a subset of data in the first cache memory. No data from the second cache memory is ever down loaded to the system memory. Data integrity in the system memory is maintained using the first cache memory only. Whenever the processor writes data, the processor writes data both to the first cache memory and to the second cache memory. Whenever the processor reads data, the processor attempts to read data from the second cache memory. If there is a miss at the second cache memory, the processor attempts to read data from the first cache memory. If there is a miss at the first cache memory, the data is retrieved from the system memory and placed in the first cache memory. The processor then reads the data from the first cache memory.

Generally, when the processor reads data from the first cache memory, the read data is written into the second cache memory. However, in some embodiments of the present invention the first cache memory and the second cache memory may be accessed in parallel. In such embodiments every time the processor desires data, the processor attempts to read both the first and the second cache memory. The read to the second cache memory will complete first. If the data is in the second cache memory, then there is no need to write the data obtained from the first cache memory back into the second cache memory.

A second processor may be added to the system which accesses the first cache memory but not the second cache memory. When the second processor writes data into the first cache memory, any data in the second cache memory which is made stale thereby is marked invalid. This is done by setting a corresponding invalid bit in a storage device. In the preferred embodiment of the present invention the storage device allows both single bit and multiple bit writes. This allows a block of words in the second cache memory to be invalidated in a single access cycle when a block of data is moved from the system memory to the first cache memory.

BRIEF DESCRIPTION OF THE DRAWINGS

FIG. 3 shows the organization of an address in accordance with a preferred embodiment of the present invention.

FIG. 4 shows a storage device used to note invalid data within the look-aside cache meory system shown in FIG. 3 in accordance with the preferred embodiment of the present invention.

DESCRIPTION OF THE PREFERRED EMBODIMENT

Figure 1:
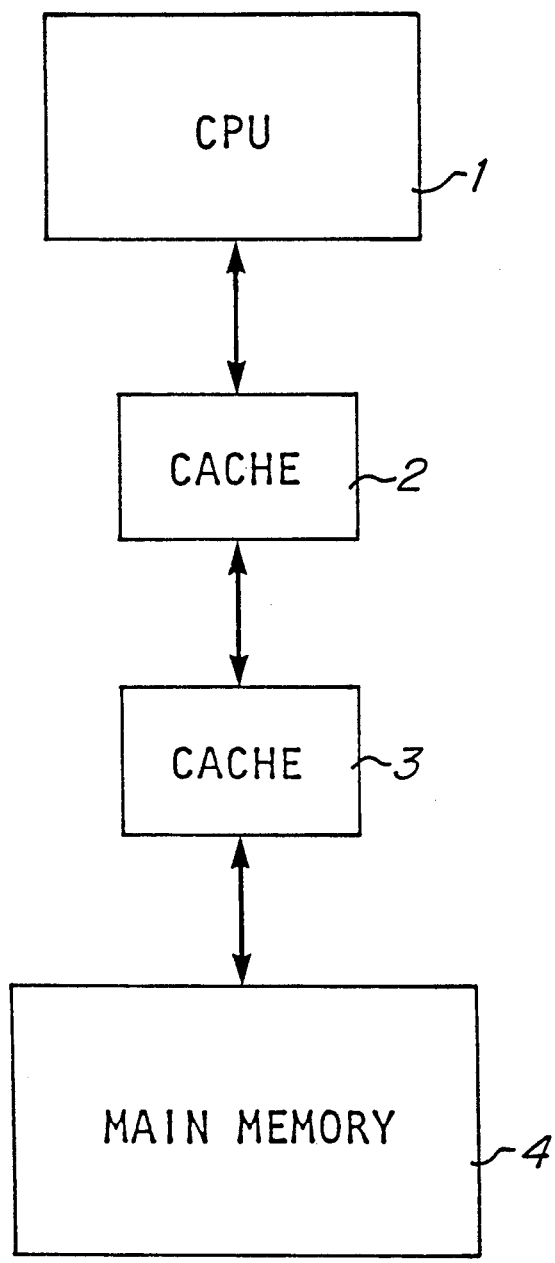
FIG. 1 shows a prior art computing system with two cache memories in series between a central processing unit and a main memory.

FIG. 1 shows a prior art multiple cache memory system. Between central processing unit (CPU) 1 and a main memory 4 a cache memory 2 and a cache memory 3 are connected in series. When reading from or writing to memory, CPU 1 will first check cache memory 2 to determine whether the data to be read or modified resides in cache memory 2. If the data resides in cache memory 2 the data transaction is performed. If the data does not reside in cache memory 2, there is a level one cache memory miss and cache memory 3 is checked to determine whether the data to be read or modified resides there. If the data does reside in cache memory 3 the data is loaded into cache memory 2 and the transaction is performed. If the data does not reside in cache memory 3, there is a level two cache memory miss and the data is retrieved from main memory 4, the data is loaded into cache memory 3 and cache memory 2 and the data transaction is performed.

Figure 2:
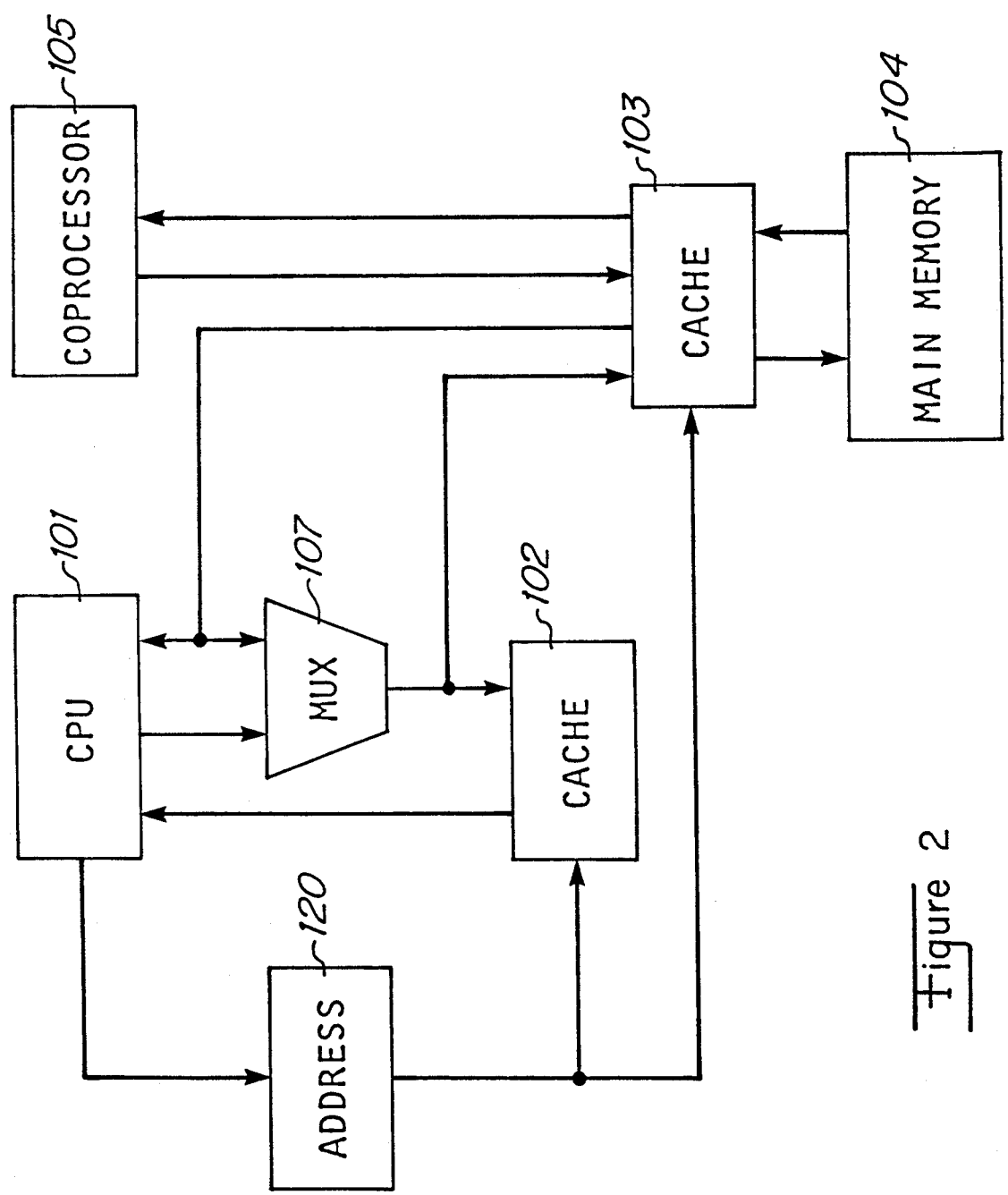
FIG. 2 shows a main cache memory and a look-aside cache memory connected between a central processing unit, a co-processor and a main memory in accordance with the preferred embodiment of the present invention.

FIG. 2 shows a multiple cache memory system in accordance with the preferred embodiment of the present invention. When reading from memory, a central processing unit (CPU) 101 forwards an address 120 of data to a cache memory 102 and to a cache memory 103 in parallel. For example, cache memory 102 contains 2K blocks of 32-bit words and cache memory 103 contains 4K blocks of sixteen 32-bit words.

FIG. 3 shows examples of address organization 120 when accessing cache memory 102 or cache memory 103. An address organization 125 is used when accessing cache memory 103. An address is, for example, 32 bits. Bit 0 is the most significant bit and bit 31 is the least significant bit. In address organization 125, bits 0–13 are used as an address tag 121; bits 14–25 are used as a cache memory index 122; bits 26–29 are used as a line index 123; and bits 30 and 31 are used as a byte offset 124. Line index 123 points to a word within a line.

An address organization 135 is used when accessing cache memory 102. In address organization 135, bits 0–18 are used as an address tag 131; bits 19–29 are used as a cache memory index 132; and bits 30 and 31 are used as a byte offset 134.

If the desired data resides in cache memory 102 the data is forwarded to CPU 101. If the desired data resides in cache memory 103 but not in cache memory 102, cache memory 103 forwards the data to CPU 101 and through a multiplexor 107 to cache memory 102. The victim line in cache memory 102 may be overwritten even if the data has been modified. If the desired data does not reside in cache memory 103, the data is fetched from main memory 104 and written into cache memory 103. If a dirty bit for the victim line is set, the victim line is written into main memory 104. Otherwise the victim line in cache memory 103 is overwritten. Cache memory 103 then forwards the data retrieved from main memory 104 to CPU 101 and through multiplexor 107 to cache memory 102.

When writing to memory, CPU 101 forwards address 120 to cache memory 102 and cache memory 103. The data is written into cache memory 102 at the index indicated by address 120. Cache memory 103 checks to see if the data to be modified exists in cache memory 103. If so, the data is written into cache memory 103 at the location specified by the index of address 120. If data to be modified is not present in cache memory 103, the data to be modified is fetched from main memory 104 and written into cache memory 103. A victim line within cache memory 103 is overwritten if the victim line is not dirty. If the victim line is dirty, the victim line is written to main memory 104 and before the data from main memory 104 is written into cache memory 103.

While CPU 101 utilizes both cache memory 102 and cache memory 103, co-processor 105 utilizes only cache memory 103. When co-processor 105 reads data, the data is read from cache memory 103. If there is a miss in cache memory 103, data is fetched from main memory 104. The new data is placed in cache memory 103.

Such usage of cache memory 102 by some functional units and not others allows faster operation of cache memory 103. For example, co-processor 105 may perform floating point calculations. Thus integer loads and stores (to and from a general register file) would utilize both cache memory 102 and cache memory 103. Floating point loads and stores, however, would be done utilizing only cache memory 103.

When data is placed in cache memory 103 but not in cache memory 102—for example by a transfer of a block of data from main memory 104 to cache memory 103 or by a 32-bit word write from co-processor 105 to cache memory 103—stale data within cache memory 102 must be invalidated. In the case of a transfer of a block of data from main memory 104 to cache memory 103, an entire region of data within cache memory 102 may need to be invalidated. In the preferred embodiment of the present invention, in order to avoid time-consuming checking of which data blocks actually reside in cache memory 102 all data locations within cache memory 102 which could contain data being transferred from main memory 104 to cache memory 103 are invalidated. Thus the size of the region in cache memory 102 to be invalidated is equal to the size of the block transferred from main memory 104 to cache memory 103. In the case of a 32-bit word write from co-processor 105 to cache memory 103 a word of data within cache memory 102 may need to be invalidated.

In order to allow the versatility of quickly invalidate within cache memory 102 either a single 32-bit word or a block of eight 32-bit words, a special memory 140, shown in FIG. 4, is used. Memory 140 contains an invalid bit for each 32-bit word location in cache memory 102. Data may be written to memory 140 one bit at a time—for invalidating individual 32-bit words of data in cache memory 102—or data may be written to memory 140 eight bits at a time—for invalidating a block of eight 32-bit words within cache memory 102.

Memory 140 includes lines 147 for receiving 8 bits of data and lines 141 on which data within memory 140 is placed. Data within memory 140 is addressed using address lines 142 and address lines 143. When addressing data in eight bit-bytes only address lines 142 are used. When addressing individual bits of data, address lines 142 and address lines 143 are used. Upon a line 145 a write enable is placed. Upon a line 146 is placed a signal which indicates whether a single bit of data or eight-bits of data are to be written into memory 140.

As discussed above, CPU 101 accesses cache memory 102 and cache memory 103 simultaneously. In order to additionally increase execution efficiency, CPU 101 may continue executing instructions past a load operation which has not completed because the data sought was not in cache memory 102. This may be done unless CPU 101 encounters an instruction which requires the result of the load before the load completes.

The following tables illustrate various ways instructions may be executed. In Table 1 below, operation of CPU 1 is shown. CPU 1 is shown to perform pipelined execution of instructions. Each instruction is executed in three stages. The first stage is the fetch stage. In the fetch stage CPU 1 fetches the instruction. The second stage is the ALU stage. In the ALU stage the instruction is decoded and any arithmetic operations (including address calculation) are performed. The third stage is the memory stage. In the memory stage data is written to memory or read from memory. Table 1 shows five execution cycles in which a load instruction and three operation instructions are started. In cycle 2 the instruction "Load A" misses, i.e., CPU 1 fails to find the desired data in cache memory 2. Thus there is a cache memory miss at cache memory 2. In cycle 3 and cycle 4 the desired data is retrieved from cache memory 3, loaded into cache memory 2 and made available to CPU 1. In cycle 5 normal operation is resumed.

TABLE 1

| CYCLE # | FETCH STAGE | ALU STAGE | MEMORY STAGE |
|---|---|---|---|
| 0 | Load A | *** | *** |
| 1 | Op 1 | Load A | *** |
| 2 | Op 2 | Op 1 | Load A |
| 3 | Op 2 | Op 1 | Load A |
| 4 | Op 2 | Op 1 | Load A |
| 5 | Op 3 | Op 2 | Op 1 |

As discussed above, because there was a cache memory miss at cache memory 2 in cycle 2, further processing is stopped until data is retrieved from cache memory 3. However, if there is no immediate need for data "A", CPU 1 can continue executing instructions past the load operation which has not completed. In Table 2, in order to illustrate this two cache memory access stages (Cache Stage I, and Cache Stage II) have been added. The cache memory access stages represent the cycles necessary to retrieve data from cache memory 3 when there is a miss in cache memory 2. Cache Stage I and Cache Stage II are pseudo stages which are only utilized by instructions when there is a miss at cache memory 2.

However, when there is an immediate need for data being fetched from cache memory 3, it is no longer possible to execute instructions past the instruction in which there was a miss at cache memory 2. For example, in cycle 4 of Table 2 a load B is started. In cycle 6 a cache memory miss occurs when data "B" is not found in cache memory 2. In cycle 7 and cycle 8 the data is obtained from cache memory 3. However, the instruction following "Load B" is "Use B" which is an operation which uses data "B" obtained by operation "Load B". Therefore, further execution of instructions must stand idle during cycle 7 and cycle 8 while data "B" is being retrieved from cache memory 3. In cycle 9 normal operation is resumed.

TABLE 2

| CYCLE NUMBER | FETCH STAGE | ALU STAGE | MEMORY STAGE | CACHE STAGE I | CACHE STAGE II |
|---|---|---|---|---|---|
| 0 | Load A | *** | *** | | |
| 1 | Op 1 | Load A | *** | | |
| 2 | Op 2 | Op 1 | Load A | | |
| 3 | Op 3 | Op 2 | Op 1 | (Load A) | |
| 4 | Load B | Op 3 | Op 2 | | (Load A) |
| 5 | Use B | Load B | Op 3 | | |
| 6 | Op 4 | Use B | Load B | | |
| 7 | Op 4 | Use B | *** | (Load B) | |
| 8 | Op 4 | Use B | *** | | (Load B) |
| 9 | Op 5 | Op 4 | Use B | | |

In Table 3 below operation of CPU 101 is shown. CPU 101 is also assumed to pipeline execution of instructions. Each instruction is executed in three stages. The first stage is the fetch stage. In the fetch stage CPU 101 fetches the instruction. The second stage is the ALU stage. In the ALU stage the instruction is decoded and any arithmetic operations (including address calculation) are performed. The third stage is the memory stage. In the memory stage data is written to memory or read from memory.

When there is a cache memory miss for data being fetched from cache memory 102 and there is no immediate need for the data, CPU 101 may continue executing instructions past the operation which has not completed. In order to illustrate this, cache memory access stages Cache Stage I and Cache Stage II are shown in Table 3. Stages Cache Stage I and Cache Stage II represent the cycles necessary to retrieve data from cache memory 103 when there is a miss in cache memory 102. Cache Stage I and Cache Stage II are pseudo stages which are only utilized by instructions when there is a miss at cache memory 102.

Table 3 illustrates what happens if CPU 101 is continuing execution past a load which has not yet completed. In cycle 2, Load A has a cache memory miss of data at cache memory 102. In cycle 3 the instruction "Load A" obtains data from cache memory 103. In cycle 4, "Load A" copies the data from cache memory 103 into cache memory 102. However, Load B is in the "Memory Stage" and is attempting to read data from cache memory 102. Since both instructions cannot simultaneously access cache memory 102 during cycle 4, the normal operation of the machine is halted until "Load A" has completed copying data. In cycle 5 the instruction "Load B" is able to access cache memory 102 and normal operation is resumed.

TABLE 3

| CYCLE NUMBER | FETCH STAGE | ALU STAGE | MEMORY STAGE | CACHE STAGE I | CACHE STAGE II |
|---|---|---|---|---|---|
| 0 | Load A | *** | *** | | |
| 1 | Op 1 | Load A | *** | | |
| 2 | Load B | Op 1 | Load A | | |
| 3 | Op 2 | Load B | Op 1 | (Load A) | |
| 4 | Op 3 | Op 2 | Load B | | (Load A) |
| 5 | Op 3 | Op 2 | Load B | | |
| 6 | Op 4 | Op 3 | Op 2 | | |

In order to avoid the delay which occurs when there is a conflict in instructions attempting to access cache memory 102, CPU 101 may force a cache memory miss of cache memory 102. That is, whether or not the data is actually in cache memory 102, CPU 101 will obtain the data from cache memory 103. This is illustrated by Table 4 below. In cycle 4 both the instruction "Load A" and the instruction "Load B" are attempting to access cache memory 102. Rather than halting operation, CPU 101 forces a cache memory miss of cache memory 102 and in cycle 5 and in cycle 6 the data is retrieved from cache memory 103.

TABLE 4

| CYCLE NUMBER | FETCH STAGE | ALU STAGE | MEMORY STAGE | CACHE STAGE I | CACHE STAGE II |
|---|---|---|---|---|---|
| 0 | Load A | *** | *** | | |
| 1 | Op 1 | Load A | *** | | |
| 2 | Load B | Op 1 | Load A | | |
| 3 | Op 2 | Load B | Op 1 | (Load A) | |
| 4 | Op 3 | Op 2 | Load B | | (Load A) |
| 5 | Op 4 | Op 3 | Op 2 | (Load B) | |
| 6 | Op 5 | Op 4 | Op 3 | | (Load B) |

The method illustrated in Table 4 is an improvement over other designs because it decreases the performance penalties incurred by CPU 101 due to contention between two instructions which are simultaneously scheduled to access cache memory 102.

An alternate solution to that presentented in Table 4 is presented in Table 5 below. In cycle 4 of Table 5, both the instruction "Load A" and the instruction "Load B" are attempting to access cache memory 102. Instead of allowing the instruction "Load A" to complete and forcing a miss on cache memory 102 of instruction "Load B" as in the example illustrated by Table 4, the instruction "Load B" is allowed to access cache memory 102 and the instruction "Load A" is prevented from putting data into cache memory 102.

TABLE 5

| CYCLE NUMBER | FETCH STAGE | ALU STAGE | MEMORY STAGE | CACHE STAGE I | CACHE STAGE II |
|---|---|---|---|---|---|
| 0 | Load A | *** | *** | | |
| 1 | Op 1 | Load A | *** | | |
| 2 | Load B | Op 1 | Load A | | |
| 3 | Op 2 | Load B | Op 1 | (Load A) | |
| 4 | Op 3 | Op 2 | Load B | | (Load A) |
| 5 | Op 4 | Op 3 | Op 2 | | |
| 6 | Op 5 | Op 4 | Op 3 | | |

As shown in Table 5, above, the instruction "Load B" successfully found data in cache memory 102. However, it is possible that the desired data might not be in cache memory 102 and the data may have to be fetched from cache memory 103 or main memory 104.

One possible disadvantage to the method illustrated by Table 5 is that since the instruction "Load A" was not allowed to update cache memory 102, the next time the data that was not updated is sought there will again be a cache miss at cache memory 102. However, since each cache miss at cache memory 102 may result in further collisions additional data in cache memory 102 may not be updated. It is conceivable, therefore, that frequent misses to cache memory 102 might result in the pathological situation that the miss rate at cache memory 102 may prevent updating of cache memory 102. This could result in cache memory 102 containing less and less useful information resulting in more misses at cache memory 102. The possibility of such a pathological situation is conditional upon many factors including the frequency of accesses to cache memory 102 and the frequency that data normally placed within cache memory 102 is reused.

We claim:

1. A computing system comprising:
a first processor;
a system memory containing computer system data utilized by the first processor;
a first cache memory, connected directly to the first processor and to the system memory, the first cache memory containing a subset of the computer system data in the system memory;
a second cache memory, connected directly to the first processor, the second cache memory containing a subset of the subset of computer system data; and,
updating means, coupled to the first processor, the first cache memory and the second cache memory, for updating the subset of the subset of computer system data in the second cache memory when the first processor writes a portion of the computer system data to the first cache memory and when the first processor reads a portion of the subset of the computer system data directly from the first cache memory.

2. A computing system as in claim 1 wherein the second cache memory includes means for, when first data from the computer system data are transferred from the system memory to the first cache memory, marking invalid second data from the subset of the subset of the computer system data within data locations within the second cache memory when the second data could be addressed in the second cache memory using a system memory address for the first data.

3. A computing system as in claim 1 additionally comprising:
a second processor, coupled to the first cache memory;
wherein the second cache memory includes memory means for, when the second processor writes first data from the computer system data to the first cache memory, marking invalid second data from the subset of the subset of the computer system data within data locations within the second cache memory when the second data could be addressed in the second cache memory using a system memory address for the first data.

4. A computing system as in claim 3 wherein the memory means is additionally for, when third data from the computer system data are transferred from the system memory to the first cache memory, marking invalid fourth data from the subset of the subset of computer system data within data locations within the second cache memory when the fourth data could be addressed in the second cache memory using a system memory address for the third data.

5. A computing system as in claim 4 wherein the memory means includes a data storage means for storing a plurality of bits, each bit representing a data location within the second cache memory and each bit indicating whether the data location represented by the bit contains data which are invalid, wherein bits within the data storage are addressable one bit at a time and are addressable in groups of bits.

6. A computing system as in claim 5 additionally comprising:
means, coupled to the the second processor and the first cache memory, for writing fifth data from the computer system data located in the second processor to the first cache memory a word at-a-time; and means, coupled to the first cache memory and the system memory, for writing sixth data from the computer system data located in the system memory to the first cache memory eight words at-a-time;

wherein the memory means includes means for, when writing seventh data from the subset of the subset of the computer system data located in the second processor to the first cache memory invalidates data within the second cache memory, setting a bit within the data storage means and for, when writing eighth data from the computer system data from the system memory to the first cache memory invalidates ninth data from the subset of the subset of the computer system data within the second cache memory, setting a group of eight bits within the data storage means.

7. In a computing system, a method for utilizing a first cache memory and a second cache memory, each directly connected to a processor, to provide quick access to a subset of data in a system memory, each data access by the processor being for the purpose of reading or writing data to the system memory, the method comprising the steps of:
 (a) for each data access by the processor, simultaneously accessing the first cache memory and the second cache memory,
 (b) when a data access is for the purpose of reading first data, performing the following substeps
  (b.1) determining whether the first data are present in the first cache memory, and
  (b.2) when the first data are present in the first cache memory, reading the first data by the processor directly from the first cache memory;
 (c) when a data access is for the purpose of reading the first data and the first data are not present in the first cache memory, performing the following substeps
  (c.1) determining whether the first data are present in the second cache memory, and
  (c.2) when the first data are present in the second cache memory, performing the following substeps,
   (c.2.1) reading, by the processor, the first data directly from the second cache memory,
   (c.2.2) writing the first data into the first cache memory; and,
 (d) when a data access is for the purpose of reading the first data and the first data are not present in the first cache memory and are not present in the second cache memory, transferring the first data from the system memory to the second cache memory and performing the following substeps,
  (d1) reading, by the processor, the first data directly from the second cache memory,
  (d2) writing the first data into the first cache memory.

8. A method as in claim 7 additionally comprising the steps of:
 (e) when a data access is for the purpose of writing new data from the processor to the system memory, the writing of the new data from the processor resulting in the modification of the existing data, performing the following substeps:
  (e.1) determining whether the existing data resides in the second cache memory, and
  (e.2) when the existing data resides in the second cache memory, writing the new data into the first cache memory and into the second cache memory;
 (f) when a data access is for the purpose of writing the new data from the processor to the system memory, the writing of the new data from the processor resulting in the modification of the existing data, when the existing data do not reside in the second cache memory, performing the following substeps,
  (f1) transferring the existing data from the system memory to the second cache memory,
  (f2) writing the new data into the first cache memory and into the second cache memory.

9. In a computing system, a method for utilizing a first cache memory and a second cache memory by a first processor and a second processor to provide quick access to a subset of data in a system memory, the first cache memory and the second cache memory being directly connected to the first processor and each data access by the first processor and by the second processor being for the purpose of reading or writing data to the system memory, the method comprising the steps of:
 (a) for each data access by the first processor, simultaneously accessing the first cache memory and the second cache memory;
 (b) for each data access by the second processor accessing the first cache memory only;
 (c) when a data access by the first processor is for the purpose of reading first data performing the following substeps:
  (c.1) determining whether the first data are present in the second cache memory, and
  (c.2) when the first data are present in the second cache memory, reading the first data by the first processor directly from the second cache memory;
 (d) when a data access by the first processor is for the purpose of reading the first data and the first data are not present in the second cache memory, performing the following substeps:
  (d.1) determining whether the first data are present in the first cache memory, and
  (d.2) when the first data are present in the first cache memory, performing the following substeps,
   (d.2.1) reading, by the first processor, the first data directly from the first cache memory,
   (d.2.2) writing the first data into the second cache memory; and,
 (e) when a data access by the first processor is for the purpose of reading the first data and the first data are not present in the second cache memory and are not present in the first cache memory, transferring the first data from the system memory to the first cache memory.

10. A method as in claim 9 wherein step (e) includes performing the following substeps:
 (e1) reading, by the first processor, the first data from the first cache memory,
 (e2) writing the first data into the second cache memory.

11. A method as in claim 10 additionally comprising the steps of:
 (f) when a data access by the second processor is for the purpose of reading the first data, performing the following substeps:

(f.1) determining whether the first data are present in the first cache memory, and (f.2) when the first data are present in the first cache memory, reading, by the second processor, the first data from the first cache memory, (g) when a data access by the second processor is for the purpose of reading the first data and the first data are not present in the first cache memory, transferring the first data from the system memory to the first cache memory and reading, by the second processor, the first data from the first cache memory.

12. In a computing system, a method for utilizing a first cache memory and a second cache memory by a first processor and a second processor to provide quick access to a subset of data in a system memory, the first cache memory and the second cache memory being directly connected to the first processor and each data access by the first processor and by the second processor being for the purpose of reading or writing data to the system memory, the method comprising the steps of:

(a) for each data access by the first processor, simultaneously accessing the first cache memory and the second cache memory;

(b) for each data access by the second processor accessing the first cache memory only;

(c) when a data access is for the purpose of writing new data from the first processor to the system memory, so that the writing of the new data from the processor results in the modification of existing data, performing the following substeps:

(c.1) determining whether the existing data resides in the first cache memory, and (c.2) when the existing data resides in the first cache memory, writing the new data into the second cache memory and into the first cache memory; and, (d) when a data access is for the purpose of writing the data from the first processor to the system memory, so that the writing of the new data from the processor results in the modification of the existing data and when the existing data do not reside in the first cache memory, performing the following substeps, (d1) transferring the existing data from the system memory to the first cache memory, and (d2) writing the new data into the second cache memory and into the first cache memory.

13. A method as in claim 12 additionally comprising the steps of:

(e) when a data access is for the purpose of writing the new data from the second processor to the system memory so that the writing of the new data from the processor results in the modification of the existing data, performing the following substeps:

(e.1) determining whether the the existing data resides in the first cache memory, and (e.2) when the existing data resides in the first cache memory, writing the new data into the first cache memory and invalidating the existing data in the second cache memory; and, (f) when a data access is for the purpose of writing data from the second processor to the system memory so that the writing of the new data from the processor results in the modification of existing data and when the existing data do not reside in the first cache memory, performing the following substeps, (f1) transferring the existing data from the system memory to the first cache memory, (f2) for any data which existed both in the second cache memory and in the first cache memory and which data was overwritten in the first cache memory, invalidating the data in the second cache memory.

* * * * *